United States Patent
Lee et al.

(10) Patent No.: US 12,315,228 B2
(45) Date of Patent: May 27, 2025

(54) METHOD AND APPARATUS WITH RECOGNITION MODEL TRAINING

(71) Applicant: Samsung Electronics Co., Ltd., Suwon-si (KR)

(72) Inventors: Huijin Lee, Pohang-si (KR); Wissam Baddar, Suwon-si (KR); Minsu Ko, Suwon-si (KR); Sungjoo Suh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 17/978,425

(22) Filed: Nov. 1, 2022

(65) Prior Publication Data

US 2023/0143874 A1  May 11, 2023

(30) Foreign Application Priority Data

Nov. 5, 2021 (KR) .................. 10-2021-0151298
Feb. 25, 2022 (KR) .................. 10-2022-0025159

(51) Int. Cl.
   *G06V 10/77* (2022.01)
   *G06V 10/774* (2022.01)
   *G06V 10/82* (2022.01)

(52) U.S. Cl.
   CPC ........ *G06V 10/774* (2022.01); *G06V 10/7715* (2022.01); *G06V 10/82* (2022.01)

(58) Field of Classification Search
   CPC ... G06V 10/774; G06V 10/7715; G06V 10/82
   See application file for complete search history.

(56) References Cited

U.S. PATENT DOCUMENTS

| 2019/0012581 A1* | 1/2019 | Honkala ............... G06V 10/758 |
| 2019/0377979 A1* | 12/2019 | Jiang ..................... G06F 18/217 |

(Continued)

FOREIGN PATENT DOCUMENTS

| CN | 107609586 A | 1/2018 |
| CN | 113033359 A | 6/2021 |

(Continued)

OTHER PUBLICATIONS

O Pinheiro, Pedro O., et al. "Unsupervised learning of dense visual representations." *Advances in Neural Information Processing Systems* vol. 33 (2020). pp. 1-14.

(Continued)

*Primary Examiner* — Bobbak Safaipour
(74) *Attorney, Agent, or Firm* — NSIP Law

(57) ABSTRACT

A processor-implemented method includes: generating a first sample image and a second sample image by performing data augmentation on an input training image; generating a first feature map of the first sample image and a second feature map of the second sample image by performing feature extraction on the first sample image and the second sample image using an encoding model; determining first loss data according to a relationship between first feature vectors of the first feature map and second feature vectors of the second feature map; estimating relative geometric information of the first feature map and the second feature map using a relationship estimation model; determining second loss data according to the relative geometric information, based on label data according to a geometric arrangement of the first sample image and the second sample image in the input training image; and training the encoding model and the relationship estimation model, based on the first loss data and the second loss data.

24 Claims, 10 Drawing Sheets

(56) References Cited

U.S. PATENT DOCUMENTS

| | | | | |
|---|---|---|---|---|
| 2021/0350168 A1* | 11/2021 | Tian | | G06T 3/40 |
| 2021/0390723 A1* | 12/2021 | Ye | | G06T 7/564 |
| 2023/0123532 A1* | 4/2023 | Sterkin | | G06N 3/045 |
| | | | | 345/424 |
| 2023/0130863 A1* | 4/2023 | Kuzdeba | | G06N 3/09 |
| | | | | 706/41 |
| 2024/0020530 A1* | 1/2024 | Kudo | | G06N 3/08 |

FOREIGN PATENT DOCUMENTS

| | | |
|---|---|---|
| CN | 113569824 A | 10/2021 |
| KR | 10-2021-0048187 A | 5/2021 |
| KR | 10-2302341 B1 | 9/2021 |

OTHER PUBLICATIONS

Xie, Zhenda, et al. "Propagate yourself: Exploring pixel-level consistency for unsupervised visual representation learning." *Proceedings of the IEEE/CVF Conference on Computer Vision and Pattern Recognition.* (2021). pp. 16684-16693.

Chen, Ting, et al. "A simple framework for contrastive learning of visual representations." *International conference on machine learning.* PMLR, (2020). pp. 1-11.

Chen, Xinlei, et al. "Improved baselines with momentum contrastive learning." *arXiv preprint arXiv:2003.04297* (2020). pp. 1-3.

He, Kaiming, et al. "Momentum contrast for unsupervised visual representation learning." *Proceedings of the IEEE/CVF conference on computer vision and pattern recognition.* (2020). pp. 9729-9738.

Tian, Yonglong, et al. "What makes for good views for contrastive learning?." *Advances in Neural Information Processing Systems* 33 (2020). pp. 1-13.

Wang, Zhaoqing, et al. "Exploring set similarity for dense self-supervised representation learning." *Proceedings of the IEEE/CVF Conference on Computer Vision and Pattern Recognition.* (2022). pp. 1-10.

Grill, Jean-Bastien, et al. "Bootstrap your own latent—a new approach to self-supervised learning." *Advances in neural information processing systems* vol. 33 (2020). pp. 1-14.

* cited by examiner

METHOD AND APPARATUS WITH RECOGNITION MODEL TRAINING

CROSS-REFERENCE TO RELATED APPLICATIONS

This application claims the benefit under 35 USC § 119(a) of Korean Patent Application No. 10-2021-0151298 filed on Nov. 5, 2021, and Korean Patent Application No. 10-2022-0025159 filed on Feb. 25, 2022, in the Korean Intellectual Property Office, the entire disclosures of which are incorporated herein by reference for all purposes.

BACKGROUND

1. Field

The following description relates to a method and apparatus with recognition model training.

2. Description of Related Art

Technical automation of a recognition process may be implemented through a neural network model implemented, for example, by a processor as a special computing structure, which may provide intuitive mapping for computation between an input pattern and an output pattern after considerable training. An ability to be trained to generate such mapping may be referred to as a learning ability of a neural network. Furthermore, a neural network trained and specialized through special training may have, for example, a generalization ability to provide a relatively accurate output in response to an untrained input pattern.

SUMMARY

This Summary is provided to introduce a selection of concepts in a simplified form that are further described below in the Detailed Description. This Summary is not intended to identify key features or essential features of the claimed subject matter, and is not intended to be used as an aid in determining the scope of the claimed subject matter.

In one general aspect, a processor-implemented method includes: generating a first sample image and a second sample image by performing data augmentation on an input training image; generating a first feature map of the first sample image and a second feature map of the second sample image by performing feature extraction on the first sample image and the second sample image using an encoding model; determining first loss data according to a relationship between first feature vectors of the first feature map and second feature vectors of the second feature map; estimating relative geometric information of the first feature map and the second feature map using a relationship estimation model; determining second loss data according to the relative geometric information, based on label data according to a geometric arrangement of the first sample image and the second sample image in the input training image; and training the encoding model and the relationship estimation model, based on the first loss data and the second loss data.

The determining of the first loss data may include: selecting, from among the first feature vectors and the second feature vectors, overlapping feature vectors corresponding to an overlapping region of the first sample image and the second sample image; and determining the first loss data, based on a difference between the overlapping feature vectors.

The relative geometric information may include at least a portion of relative position information of corresponding grid cells according to the first feature vectors and the second feature vectors in the input training image and relative scale information of corresponding images according to the first feature map and the second feature map.

The corresponding images may include either one or both of: the first sample image and the second sample image; and a first resized image resized from the first sample image and a second resized image resized from the second sample image.

The relative position information may be configured to specify an offset between the corresponding grid cells as an x-axis component and a y-axis component, and the relative scale information may be configured to specify a scale ratio of the corresponding images as a width component and a height component.

The label data may include at least a portion of label data of the relative position information according to grid cells of the first sample image and the second sample image and label data of the relative scale information according to the first sample image and the second sample image.

The relative geometric information may include mask information representing an overlapping region of corresponding images according to the first feature map and the second feature map.

The label data may include label data of the mask information according to the first sample image and the second sample image.

The label data may be determined according to the geometric arrangement of the first sample image and the second sample image, and the determining of the second loss data may include determining the second loss data, based on a difference between the label data and the relative geometric information.

The encoding model and the relationship estimation model may correspond to a neural network model.

The estimating of the relative geometric information may include: determining input data by concatenating the first feature map and the second feature map; and estimating the relative geometric information by performing a convolution operation according to the input data.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus includes: one or more processors configured to: generate a first sample image and a second sample image by performing data augmentation on an input training image; generate a first feature map of the first sample image and a second feature map of the second sample image by performing feature extraction on the first sample image and the second sample image using an encoding model; determine first loss data according to a relationship between first feature vectors of the first feature map and second feature vectors of the second feature map; estimate relative geometric information of the first feature map and the second feature map using a relationship estimation model; determine second loss data according to the relative geometric information, based on label data according to a geometric arrangement of the first sample image and the second sample image in the input training image; and train the encoding model and the relationship estimation model, based on the first loss data and the second loss data.

For the determining of the first loss data, the one or more processors may be configured to: select, from among the first feature vectors and the second feature vectors, overlapping feature vectors corresponding to an overlapping region of the first sample image and the second sample image; and determine the first loss data, based on a difference between the overlapping feature vectors.

The relative geometric information may include at least a portion of relative position information of corresponding grid cells according to the first feature vectors and the second feature vectors in the input training image and relative scale information of corresponding images according to the first feature map and the second feature map.

The label data may include label data of the relative position information according to grid cells of the first sample image and the second sample image and label data of the relative scale information according to the first sample image and the second sample image.

The relative geometric information may include mask information representing an overlapping region of corresponding images according to the first feature map and the second feature map.

The label data may include label data of the mask information according to the first sample image and the second sample image.

The label data may be determined according to the geometric arrangement of the first sample image and the second sample image, and, for the determining of the second loss data, the one or more processors may be configured to: determine the second loss data, based on a difference between the label data and the relative geometric information.

The encoding model and the relationship estimation model may correspond to a neural network model.

For the estimating of the relative geometric information, the one or more processors may be configured to: determine input data by concatenating the first feature map and the second feature map; and estimate the relative geometric information by performing a convolution operation according to the input data.

The one or more processors may be configured to generate a feature map of an image by performing feature extraction on the image using the trained encoding model.

The apparatus may include a memory storing instructions that, when executed by the one or more processors, configure the one or more processors to perform the generating of the first sample image and the second sample image, the generating of the first feature map and the second feature map, the determining of the first loss data, the estimating of the relative geometric information, the determining of the second loss data, and the training of the encoding model and the relationship estimation model.

In another general aspect, an apparatus includes: one or more processors configured to generate a feature map of an image by performing feature extraction on the image using a trained encoding model, wherein the encoding model is trained based on first loss data and second loss data, wherein the first loss data is determined based on first feature vectors of a first feature map and second feature vectors of a second feature map, and the first feature map and the second feature map are generated by performing feature extraction respectively on a first sample image and a second sample image using the encoding model, and wherein the second loss data is determined based on estimated relative geometric information of the first feature map and the second feature map, and the relative geometric information is estimated using a relationship estimation model.

Other features and aspects will be apparent from the following detailed description, the drawings, and the claims.

Figure 1:
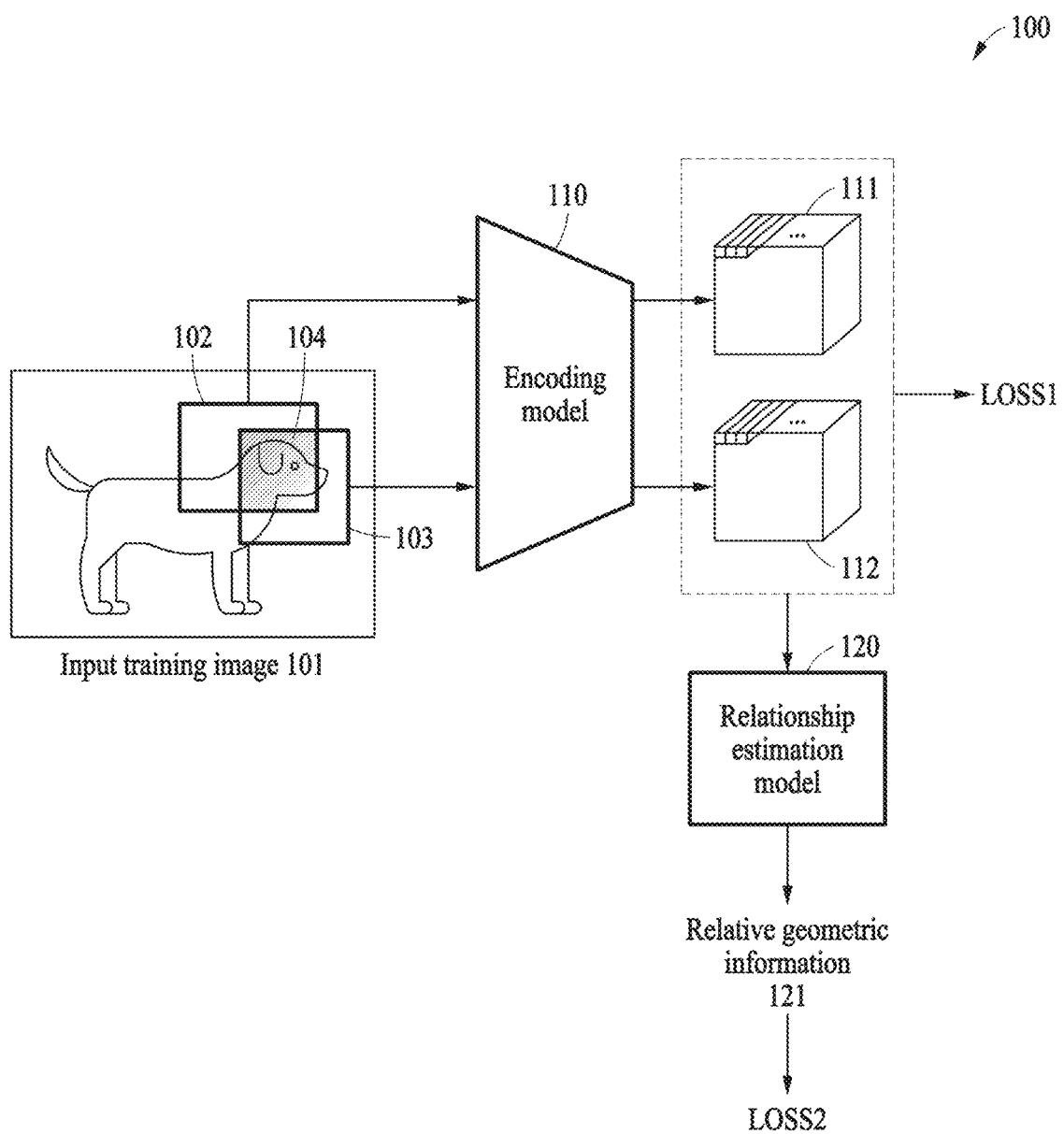
FIG. 1 schematically illustrates an example of a training structure of a recognition model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms, such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," "coupled to," or "accessed to" another component, it may be directly "connected to," "coupled to," or "accessed to" the other component, or there may be one or more other components intervening therebetween. In contrast, when an element is described as being "directly connected to," "directly coupled to," or "directly accessed to" another element, there can be no other elements intervening therebetween. Likewise, similar expressions, for example, "between" and "immediately between," and "adjacent to" and "immediately adjacent to," are also to be construed in the same way.

As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, examples will be described in detail with reference to the accompanying drawings. When describing the examples with reference to the accompanying drawings, like reference numerals refer to like components and a repeated description related thereto will be omitted.

FIG. 1 schematically illustrates an example of a training structure of a recognition model. Referring to FIG. 1, a recognition model 100 may include an encoding model 110 and a relationship estimation model 120. The encoding model 110 and the relationship estimation model 120 may be, or be included in, a neural network model. The encoding model 110 may be a backbone network. The recognition model 100 may further include a network element (e.g., a projection model, a prediction model, etc.) other than the encoding model 110 and the relationship estimation model 120. The relationship estimation model 120 may be used in a training process for the recognition model 100. In the training process, an inference operation may be performed on the recognition model 100, excluding the relationship estimation model 120.

The neural network model may include a deep neural network (DNN) including a plurality of layers, where the layers may include an input layer, one or more hidden layers, and an output layer.

The DNN may include any one or any combination of any two or more of a fully connected network (FCN), a convolutional neural network (CNN), and a recurrent neural network (RNN). For example, a portion of the layers in the neural network may be a CNN, and a remaining portion of the layers may be an FCN, where the CNN may be referred to as a convolutional layer and the FCN may be referred to as a fully connected layer.

For the CNN, data input to each layer may be referred to as an input feature map, and data output from each layer may be referred to as an output feature map. The input feature map and the output feature map may also be referred to as activation data. When the convolutional layer corresponds to an input layer, an input feature map of the input layer may be an input image.

When the neural network has been trained based on deep learning, the neural network may perform inference in a way suitable for a training purpose by mapping input data and output data that are in a nonlinear relationship to each other. The deep learning may be a machine learning scheme for solving an issue, such as image or voice recognition from a big data set. The deep learning may be construed as a process of solving an optimization issue to find a point at which energy is minimized while training the neural network, based on prepared training data.

Through supervised or unsupervised learning of the deep learning, a structure of the neural network or a weight corresponding to a model may be obtained (e.g., generated), and the input data and the output data may be mapped to each other through the weight. When a width and a depth of the neural network are sufficiently large, the neural network may have a capacity large enough to implement an arbitrary function. The neural network may achieve an optimized performance when learning a sufficiently large amount of training data through an appropriate training process.

The neural network may be expressed as being trained in advance, where "in advance" means "before" the neural network starts an inference operation. That the neural network "starts" means the neural network is ready for inference. For example, that the neural network "starts" may mean that the neural network is loaded in a memory, or that input data for inference is input to the neural network after the neural network is loaded in the memory.

In an example, the training process of FIG. 1 may be self-supervised learning. In the self-supervised learning, the training process may be a portion of the whole training process for the recognition model 100. For example, the training process may be a pretext task. Additional training may be applied to at least a portion (e.g., the encoding model 110) of the recognition model 100 trained through the pretext task for a downstream task. In an example, the training process may be per-pixel self-supervised learning, and at least a portion of the recognition model 100 may derive, in a unit of an image pixel, an output from object localization and/or object segmentation through the training process.

The training process may be performed by a training apparatus (e.g., a training apparatus 900 and/or an electronic apparatus 1000). The training apparatus may generate a first sample image 102 and a second sample image 103 by performing data augmentation on an input training image 101. The data augmentation may increase diversity of data through image transformation (e.g., scaling, rotation, cropping, color adjustment, contrast adjustment, etc.). The first sample image 102 and the second sample image 103 may have different sizes, aspect ratios, color levels, and contrast levels. The encoding model 110 may generate a first feature map 111 of the first sample image 102 and a second feature map 112 of the second sample image 103 by performing feature extraction respectively on the first sample image 102 and the second sample image 103. The encoding model 110 may include one or more convolutional layers and/or one or more fully connected layers. The training apparatus may generate the first feature map 111 and the second feature map 112 by performing a network operation (e.g., a convolutional operation) on the convolutional layer and/or fully connected layer of the encoding model 110.

The training apparatus may determine first loss data LOSS1, based on a relationship between feature vectors of the first feature map 111 (hereinafter, referred to as a "first feature vector") and feature vectors of the second feature map 112 (hereinafter, referred to as a "second feature vector"). The first feature map 111 and the second feature map 112 may each include a plurality of feature vectors. For example, the first and second feature maps 111 and 112 each may be expressed as a block of a dimension of W×H×C. W may represent a width, H may represent a height, and C may represent a channel depth. A feature vector may have a dimension of 1×1×C, where the first and second feature maps 111 and 112 may each include W×H feature vectors.

The first sample image 102 and the second sample image 103 may include an overlapping region 104. The training apparatus may select, from among the first feature vectors and the second feature vectors, feature vectors (hereinafter, referred to as "overlapping feature vectors") corresponding to the overlapping region 104, and based on a difference between the overlapping feature vectors, determine the first loss data LOSS1. Because both first overlapping feature vectors corresponding to the overlapping region 104 among the first feature vectors and second overlapping feature vectors corresponding to the overlapping region 104 among the second feature vectors correspond to the overlapping region 104, the encoding model 110 may generate the first and second feature maps 111 and 112 in such a way that there is high similarity between the first overlapping feature vectors and the second overlapping feature vectors. When the first loss data LOSS1 represents a difference between the first overlapping feature vectors and the second overlapping feature vectors, and the recognition model 100 is trained to reduce the first loss data LOSS1, the similarity between the first overlapping feature vectors and the second overlapping feature vectors may increase.

The relationship estimation model 120 may estimate relative geometric information 121 of the first feature map 111 and the second feature map 112. The relationship estimation model 120 may include one or more convolutional layers and/or one or more fully connected layers. The training apparatus may determine input data of the relationship estimation model 120 by concatenating the first feature map 111 and the second feature map 112 and generate the relative geometric information 121 by performing a network operation (e.g., a convolution operation) on the convolutional layer and/or fully connected layer of the relationship estimation model 120, based on the input data. The training apparatus may determine second loss data LOSS2, based on a difference between the relative geometric information 121 and label data. The label data may be determined according to a geometric arrangement of the first sample image 102 and the second sample image 103. The geometric arrangement of the first sample image 102 and the second sample image 103 may be identified (e.g., determined) at a timepoint when the first sample image 102 and the second sample image 103 are extracted from the input training image 101, and the label data may be configured through corresponding arrangement information.

Such a geometric arrangement and label data may be variously configured, and the relative geometric information 121 may be variously defined according to a corresponding configuration. For example, the relative geometric information 121 may include at least a portion of any one or any combination of any two or more of relative position information, relative scale information, and mask information. Non-limiting examples of the relative position information, the relative scale information, and the mask information will be described in detail further below.

The training apparatus may train at least a portion (e.g., the encoding model 110 and/or the relationship estimation model 120) of the recognition model 100, based on the first loss data LOSS1 and the second loss data LOSS2. In an example, the training apparatus may train at least a portion of the recognition model 100 such that the first loss data LOSS1 and the second loss data LOSS2 decrease.

Figure 2:
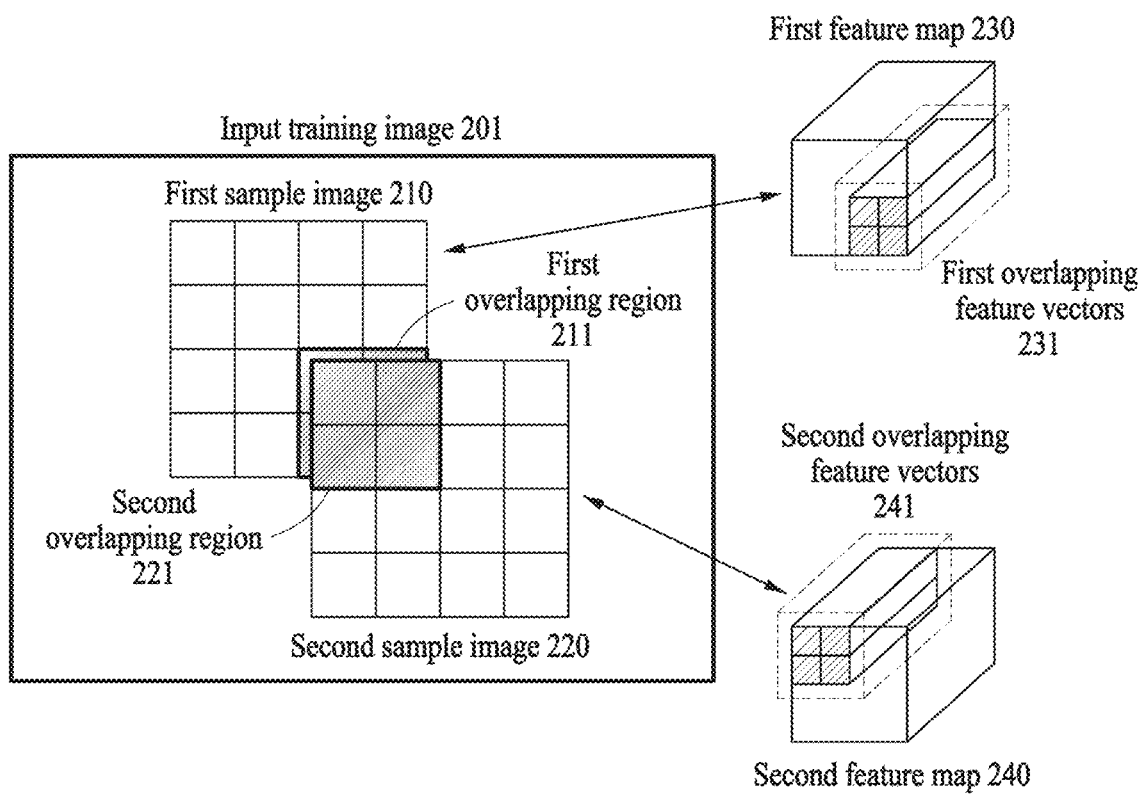
FIG. 2 illustrates an example of a training operation based on an overlapping region.

FIG. 2 illustrates an example of a training operation based on an overlapping region. Referring to FIG. 2, a first sample image 210 and a second sample image 220 may be generated from an input training image 201. The first sample image 210 and the second sample image 220 may be each divided into a plurality of grid cells. Each of the grid cells may correspond to a feature vector. For example, grid cells of the first sample image 210 may respectively correspond to first feature vectors of a first feature map 230, and grid cells of the second sample image 220 may respectively correspond to second feature vectors of a second feature map 240. A first overlapping region 211 of the first sample image 210 and a second overlapping region 221 of the second sample image 220 may be specified (e.g., determined) according to an overlap between the first sample image 210 and the second sample image 220. In addition, first overlapping feature vectors 231 corresponding to the first overlapping region 211 may be specified among the first feature vectors, and second overlapping feature vectors 241 corresponding to the second overlapping region 221 may be specified among the second feature vectors. A training apparatus may implement a training process such that similarity between the first overlapping feature vectors 231 and the second overlapping feature vectors 241 increases.

Figure 3:
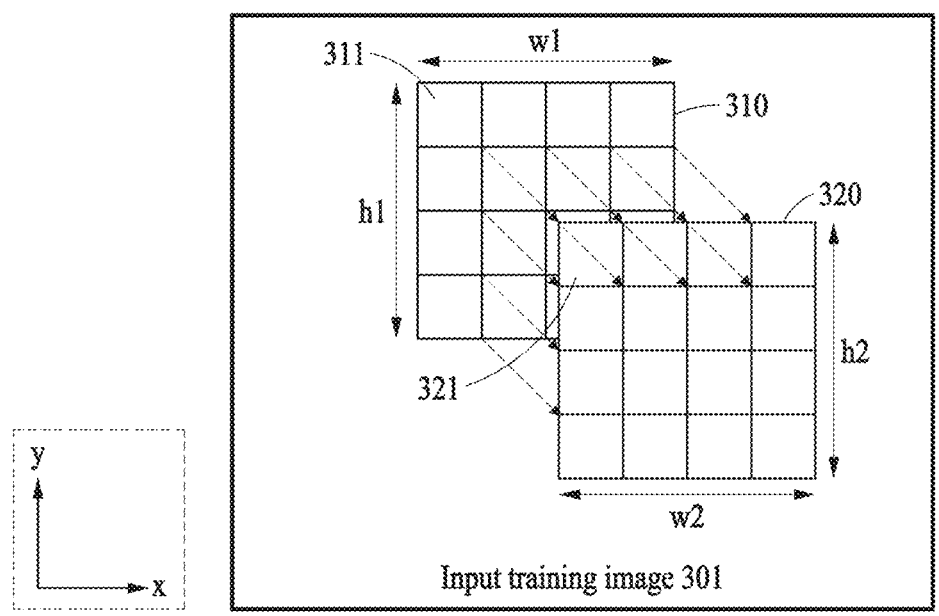
FIG. 3 illustrates an example of a geometric relationship between sample images.

FIG. 3 illustrates an example of a geometric relationship between sample images. A geometric arrangement and label data of a first sample image 310 and a second sample image 320 may be variously configured, and relative geometric information of feature maps may be variously defined according to a corresponding configuration. In an example, the label data and the relative geometric information may include at least a portion of relative position information and relative scale information of the first and second sample images 310 and 320.

A relative position between the first sample image 310 and the second sample image 320 may be defined (e.g., determined) according to respective positions of the first sample image 310 and the second sample image 320 in an input training image 301. For example, a grid cell 311 and a grid cell 321 in positions corresponding to each other may be selected respectively in the first sample image 310 and the second sample image 320, and the relative position may be specified through an offset between the grid cells 311 and 321. The relative position information may include elements corresponding to the number of grid cells, and a value of each element may be determined through an offset between corresponding grid cells. An element value may include an x-axis component and a y-axis component. For example, an element value of the relative position information may be defined as ($\Delta u$, $\Delta v$). When an x-axis component and a y-axis component of the respective grid cells 311 and 321 in positions corresponding to each other are (u1, v1) and (u2, v2), ($\Delta u1$, $\Delta v1$) may represent (u1−u2, v2−v1). u and v may correspond to normalized coordinates of a sample image.

The relative scale information may be determined through a scale ratio of the first and second sample images 310 and 320. The relative scale information may specify the scale ratio as a width component and a height component. For example, a size of the first sample image 310 may be w1×h1, and a size of the second sample image 320 may be w2×h2. In this case, (Δw, Δh) corresponding to the relative scale information may be represented as (log(w1/w2), log(h1/h2)) or (w1/w2, h1/h2). w and h may respectively correspond to a width and a height of a sample image normalized to a size of an input image.

In an example, the label data may include at least a portion of label data of relative position information according to grid cells of the first sample image 310 and the second sample image 320 and label data of relative scale information according to the first sample image 310 and the second sample image 320. In addition, the relative geometric information may be estimated by a relationship estimation model (e.g., the relationship estimation model 120), based on a first feature map (including the first sample image 310, for example) and a second feature map (including the second sample image 320, for example). A result of the estimation may include at least a portion of relative position information in the input training image 301 of corresponding grid cells according to first feature vectors of the first feature map and second feature vectors of the second feature map and relative scale information of corresponding images (e.g., the first and second sample images 310 and 320) according to the first feature map and the second feature map. A training apparatus may compare the relative position information and/or the relative scale information of the estimation result with the relative position information and/or the relative scale information of the label data and may determine second loss data according to a comparison result.

Figure 4:
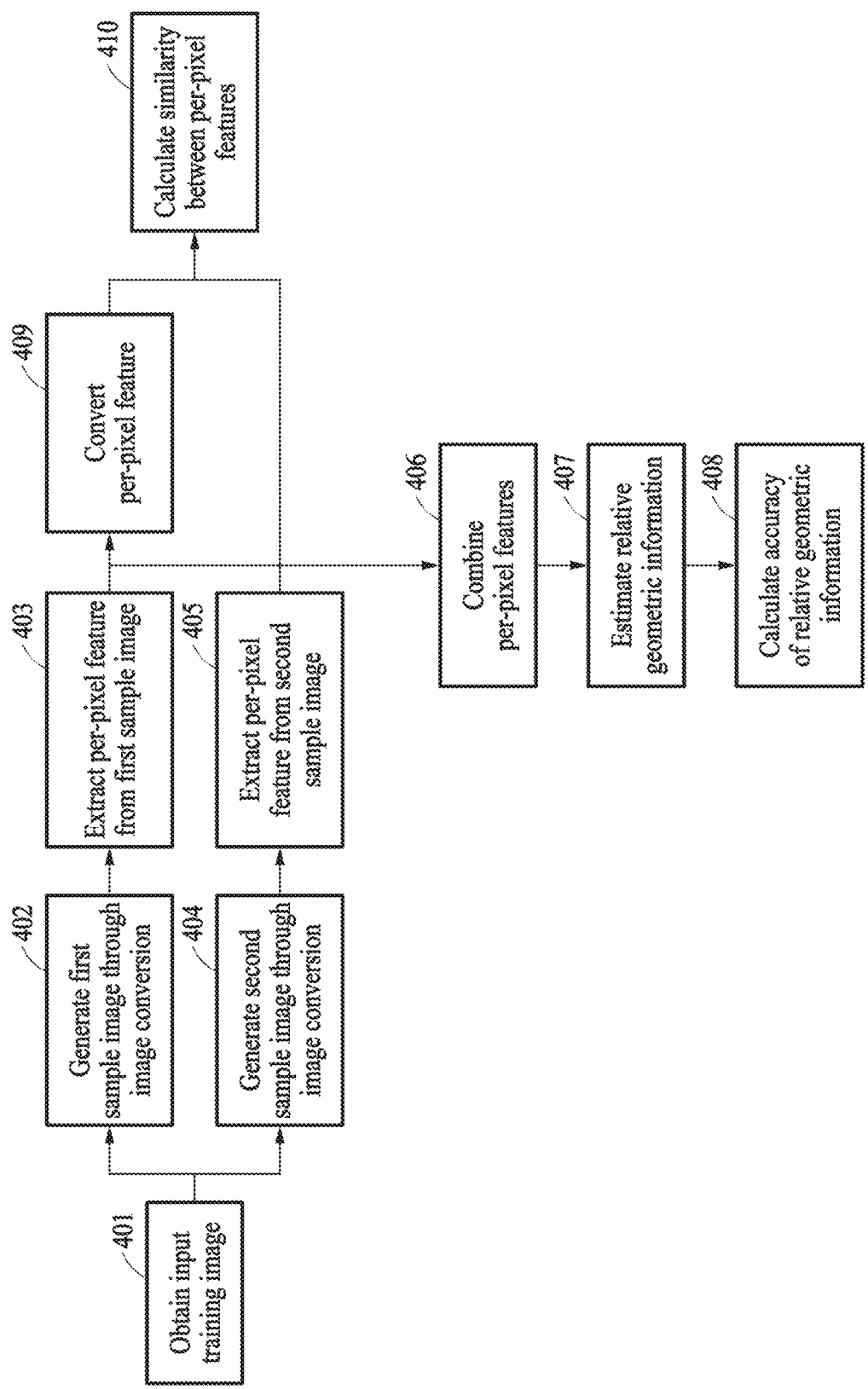
FIG. 4 illustrates an example of a training process for a recognition model.

FIG. 4 illustrates an example of a training process for a recognition model. Referring to FIG. 4, in operation 401, a training apparatus may obtain an input training image. The training apparatus may generate a first sample image through image conversion in operation 402, and extract a per-pixel feature from the first sample image in operation 403. The image conversion may be an example of data augmentation, and the per-pixel feature may correspond to a feature vector of a feature map (e.g., a first feature map). The training apparatus may generate a second sample image through image conversion in operation 404, and extract a per-pixel feature from the second sample image in operation 405.

The training apparatus may convert the per-pixel feature extracted in operation 403 in operation 409 and calculate similarity between the converted per-pixel feature and the per-pixel feature extracted in operation 405 in operation 410. The conversion of the per-pixel feature may improve training performance by providing a difference between a data flow according to the first sample image and a data flow according to the second sample image. A loss of first loss data may be determined, based on the similarity. The loss may decrease as the similarity increases.

In operation 406, the training apparatus may combine the per-pixel features extracted in operations 403 and 405. For example, the per-pixel features may be combined through concatenation. In operation 407, the training apparatus may estimate relative geometric information. The relative geometric information may include at least a portion of any one or any combination of any two or more of relative position information, relative scale information, and mask information. In an example, the relative geometric information may include relative position information and relative scale information. In another example, the relative geometric information may include mask information. In operation 408, the training apparatus may calculate the accuracy of the relative geometric information. The training apparatus may calculate the accuracy by comparing label data to the relative geometric information. A loss of second loss data may be determined, based on the accuracy. The loss may decrease as the accuracy increases.

The training apparatus may train a recognition model, based on the first loss data and the second loss data. In an example, the training apparatus may train the recognition model such that a sum of the first loss data and the second loss data decreases.

Figure 5:
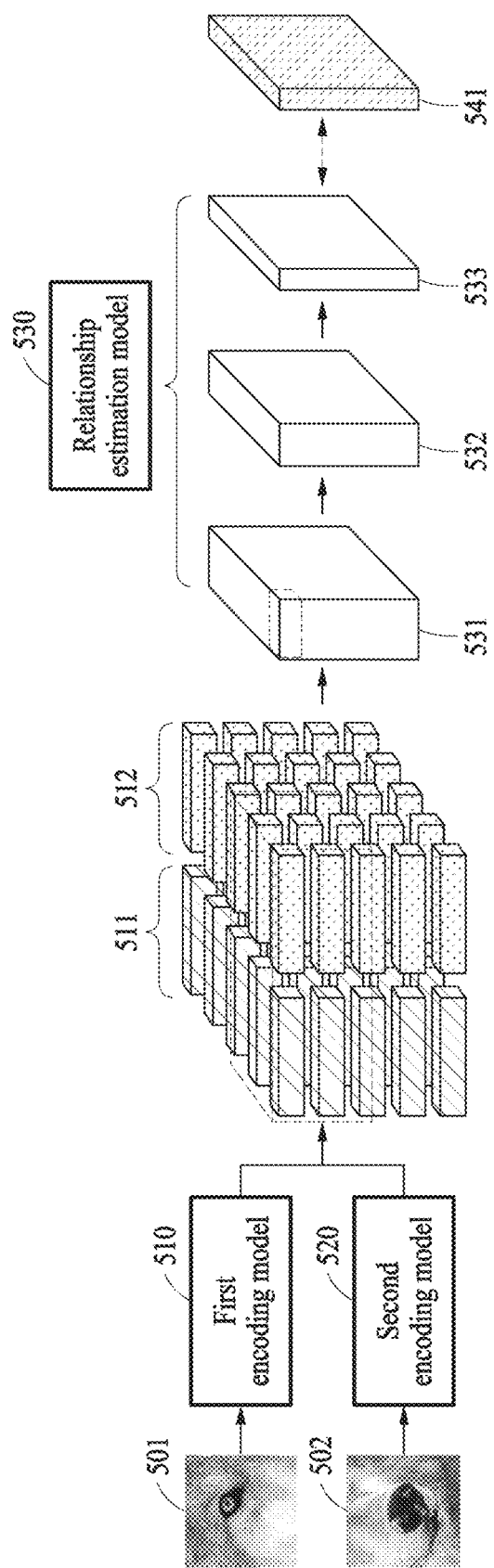
FIG. 5 illustrates an example of deriving a loss of relative geometric information.

FIG. 5 illustrates an example of deriving a loss of relative geometric information. Referring to FIG. 5, a first encoding model 510 may generate a first feature map 511, based on a first sample image 501, and a second encoding model 520 may generate a second feature map 512, based on a second sample image 502. The second encoding model 520 may correspond to a momentum version of the first encoding model 510. In an example, the second encoding model 520 may be determined by adjusting a network parameter of the first encoding model 510 with a constant momentum parameter. The first feature map 511 and the second feature map 512 may each include a plurality of feature vectors.

A relationship estimation model 530 may generate relative geometric information 533, based on the first feature map 511 and the second feature map 512. In an example, the relationship estimation model 530 may combine the first feature map 511 with the second feature map 512, and based on a combination result, generate intermediate data 531 and 532 and the relative geometric information 533 by performing a convolution operation. The training apparatus may determine second loss data by comparing the relative geometric information 533 with label data 541.

In an example, sizes of the first and second sample images 501 and 502 may each be 3×w×h, sizes of the first and second feature maps 511 and 512 may each be W×H×C, and a size of the combination result may be W×H×2C. In addition, a size of the intermediate data 531 may be W×H×C1, and a size of the intermediate data 532 may be W×H×C2. In an example, the relative geometric information 533 may include relative position information of (Δu, Δv) and relative scale information of (Δw, Δh). In this case, the relative geometric information 533 may have a size of W×H×4. In this case, four W×H planes (e.g., channels) may be defined in a channel direction, and the planes may include data of Δu, Δv, Δw, and Δh. Similarly, the label data 541 may have the size of W×H×4, and four planes may include the data of Δu, Δv, Δw, and Δh.

Figure 6:
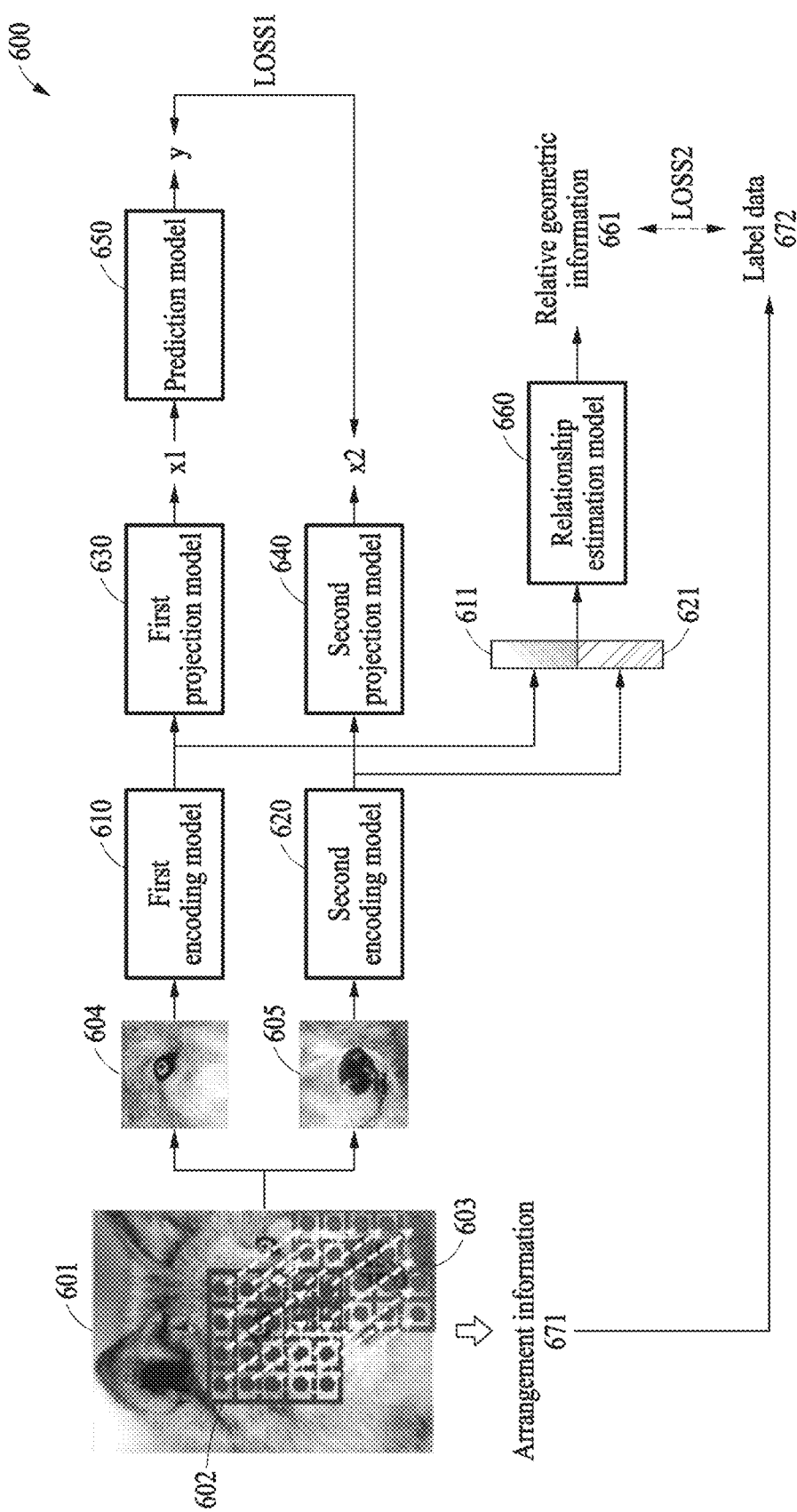
FIG. 6 illustrates an example of deriving a loss based on a relationship between feature vectors and a loss based on geometric information.

FIG. 6 illustrates an example of deriving a loss based on a relationship between feature vectors and a loss based on geometric information. Referring to FIG. 6, a recognition model 600 may include a first encoding model 610, a second encoding model 620, a first projection model 630, a second projection model 640, a prediction model 650, and a relationship estimation model 660. A training apparatus (e.g., including the recognition model 600) may determine a first sample image 602 and a second sample image 603 from an input training image 601 and generate first and second feature maps 611 and 621 respectively corresponding to the first and second sample images 602 and 603 through the first and second encoding models 610 and 620. The training apparatus may resize the first and second sample images 602 and 603 to images 604 and 605 and input the resized images 604 and 605 respectively to the first and second encoding models 610 and 620. In an example, the second encoding model 620 may correspond to a momentum version of the first encoding model 610.

The training apparatus may generate a projection result x1 corresponding to the first feature map 611 through the first projection model 630 and generate a prediction result y according to the projection result x1 through the prediction model 650. The training apparatus may generate a projection result x2 corresponding to the second feature map 621 through the second projection model 640. In an example, the second projection model 640 may correspond to a momentum version of the first projection model 630. The first and second projection models 630 and 640 and the prediction model 650 of one or more embodiments may improve training performance by adding an asymmetric element to a data flow according to the first sample image 602 and a data flow according to the second sample image 603. In an example, the first and second projection models 630 and 640 and the prediction model 650 may each correspond to a multilayer perceptron. The training apparatus may determine first loss data LOSS1, based on a difference between the prediction result y and the projection result x2.

The training apparatus may combine the first feature map 611 with the second feature map 621 and generate relative geometric information 661 corresponding to a combination result through the relationship estimation model 660. The training apparatus may determine second loss data LOSS2, based on a difference between the relative geometric information 661 and label data 672. The label data 672 may be determined according to geometric arrangement information 671 of the first sample image 602 and the second sample image 603 in the input training image 601. The training apparatus may train the recognition model 600, based on the first loss data LOSS1 and the second loss data LOSS2.

Figure 7:
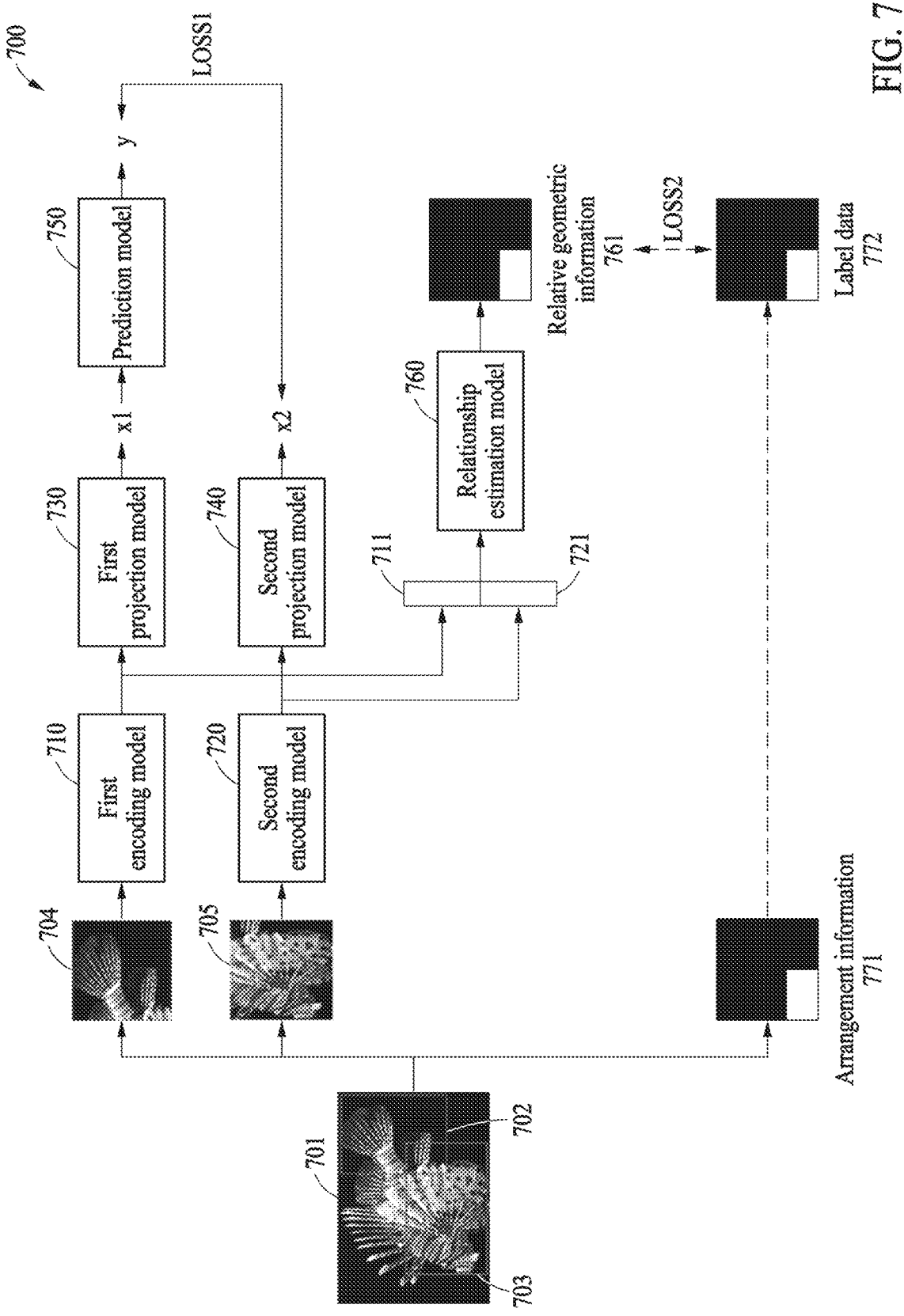
FIG. 7 illustrates an example of a training process using mask information.

FIG. 7 illustrates an example of a training process using mask information. Referring to FIG. 7, a training apparatus may determine a first sample image 702 and a second sample image 703 from an input training image 701 and generate first and second feature maps 711 and 721 respectively corresponding to the first and second sample images 702 and 703 through first and second encoding models 710 and 720. Resized images 704 and 705, instead of the first and second sample images 702 and 703, may be respectively input to the first and second encoding models 710 and 720. In an example, the second encoding model 720 may correspond to a momentum version of the first encoding model 710.

The training apparatus may generate a prediction result y in the first feature map 711 through a first projection model 730 and a prediction model 750. The training apparatus may generate a projection result x2 corresponding to the second feature map 721 through a second projection model 740. In an example, the second projection model 740 may correspond to a momentum version of the first projection model 730. The training apparatus may determine first loss data LOSS1, based on a difference between the prediction result y and the projection result x2.

The training apparatus may combine the first feature map 711 with the second feature map 721 and generate relative geometric information 761 corresponding to a combination result through a relationship estimation model 760. The training apparatus may determine second loss data LOSS2, based on a difference between the relative geometric information 761 and label data 772. The label data 772 may be determined according to geometric arrangement information 771 of the first sample image 702 and the second sample image 703 in the input training image 701. The training apparatus may train a recognition model 700, based on the first loss data LOSS1 and the second loss data LOSS2.

The relative geometric information 761 may include mask information representing an overlapping region of corresponding images (e.g., the first and second sample images 702 and 703) according to the first feature map 711 and the second feature map 721, and the label data 772 may include label data 772 of mask information according to the first sample image 702 and the second sample image 703. The label data 772 may be determined according to the arrangement information 771 representing a geometric arrangement of the first sample image 702 and the second sample image 703. The training apparatus may determine the second loss data LOSS2, based on a difference between the label data 772 and the relative geometric information 761.

In an example, the arrangement information 771, the label data 772, and the relative geometric information 761 may represent mask information. For example, mask information may represent an overlapping region as 1 and a non-overlapping region as 0. In an example, the mask information may be generated, based on the first sample image 702, as illustrated in FIG. 7. Referring to FIG. 7, a certain region in the lower left corner of the first sample image 702 may overlap the second sample image 703, and the mask information may represent such a geometric arrangement of the first sample image 702 and the second sample image 703. In various examples, the mask information may be generated based on the second sample image 703, instead of the first sample image 702, or may be generated, based on both the first sample image 702 and the second sample image 703.

Figure 8:
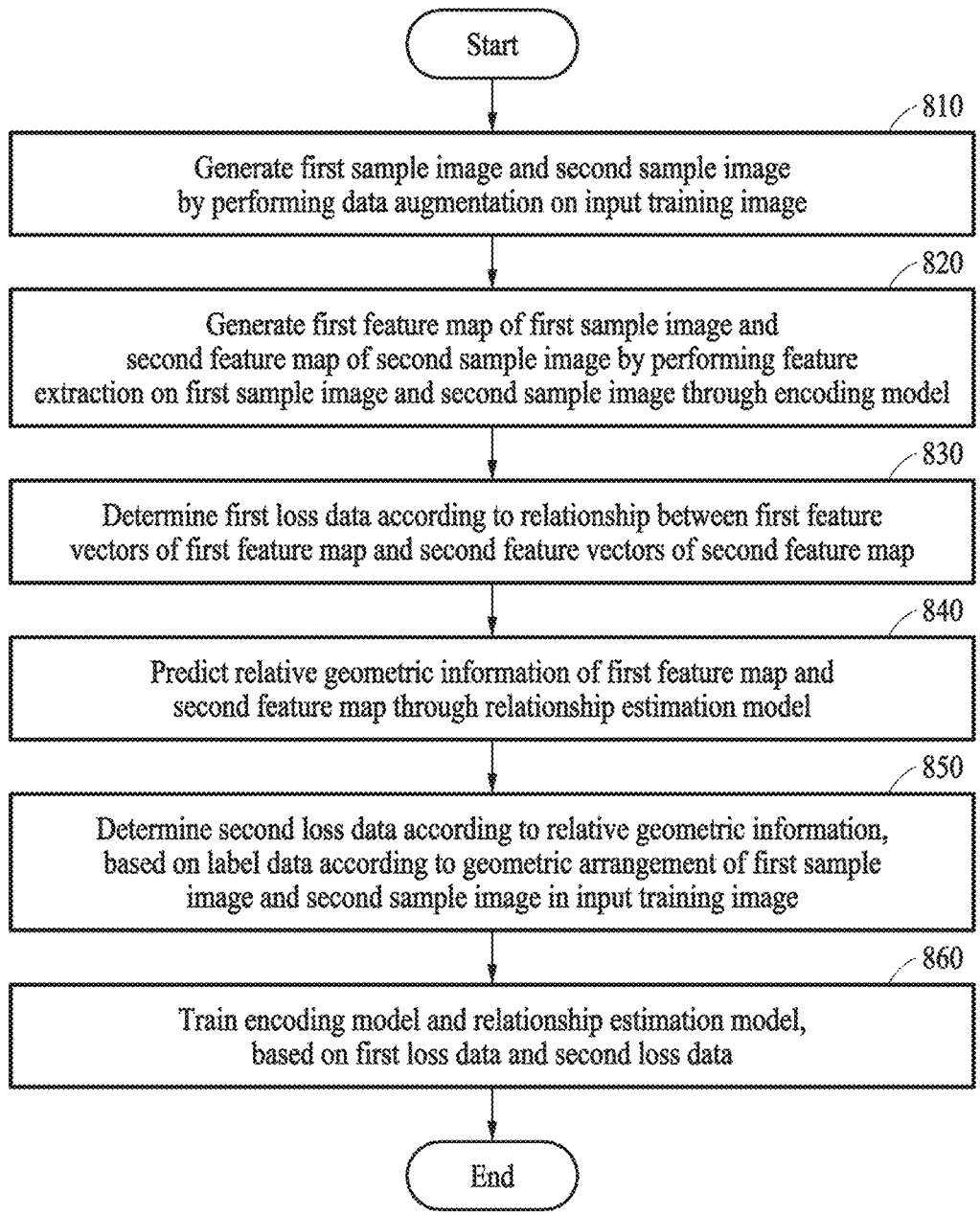
FIG. 8 illustrates an example of a training process for a recognition model.

FIG. 8 illustrates another example of a training process for a recognition model. Referring to FIG. 8, in operation 810, a training apparatus may generate a first sample image and a second sample image by performing data augmentation on an input training image. In operation 820, the training apparatus may generate a first feature map of the first sample image and a second feature map of the second sample image by performing feature extraction on the first sample image and the second sample image through an encoding model.

In operation 830, the training apparatus may determine first loss data according to relationship between first feature vectors of the first feature map and second feature vectors of the second feature map. Operation 830 may include selecting, from among the first feature vectors and the second feature vectors, overlapping feature vectors corresponding to an overlapping region of the first sample image and the second sample image and determining the first loss data, based on a difference between the overlapping feature vectors.

In operation 840, the training apparatus may predict relative geometric information of the first feature map and the second feature map through a relationship estimation model. Operation 840 may include determining input data by concatenating the first feature map and the second feature map and estimating the relative geometric information by performing a convolution operation according to the input data. The relative geometric information may include at least a portion of relative position information in the input training image of corresponding grid cells according to the first feature vectors and the second feature vectors and relative scale information of corresponding images according to the first feature map and the second feature map.

In an example, the relative position information may specify an offset between the corresponding grid cells as an x-axis component and a y-axis component, and the relative scale information may specify a scale ratio of the corresponding images as a width component and a height component. Label data may include at least a portion of label data of relative position information according to grid cells of the first sample image and the second sample image and label data of relative scale information according to the first sample image and the second sample image.

In an example, the relative geometric information may include mask information representing an overlapping region of corresponding images according to the first feature map and the second feature map. The label data may include label data of mask information according to the first sample image and the second sample image.

In operation 850, the training apparatus may determine second loss data according to the relative geometric information, based on label data according to a geometric arrangement of the first sample image and the second sample image in the input training image. The label data may be determined according to the geometric arrangement of the first sample image and the second sample image, and operation 850 may include determining the second loss data, based on a difference between the label data and the relative geometric information.

In operation 860, the training apparatus may train the encoding model and the relationship estimation model, based on the first loss data and the second loss data. The encoding model and the relationship estimation model may correspond to a neural network model. In addition, the description provided with reference to FIGS. 1 through 7, 9, and 10 may apply to the training method of FIG. 8.

Figure 9:
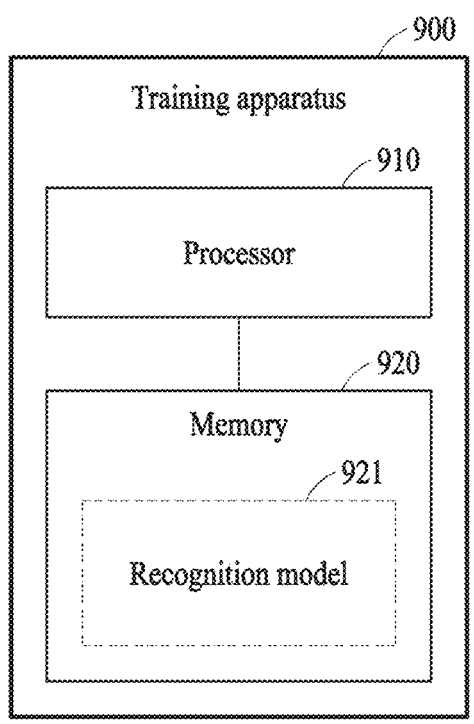
FIG. 9 illustrates an example of a schematic configuration of a training apparatus.

FIG. 9 illustrates an example of a schematic configuration of a training apparatus. Referring to FIG. 9, a training apparatus 900 may include a processor 910 (e.g., one or more processors) and a memory 920 (e.g., one or more memories). The memory 920 may store a recognition model 921. The memory 920 may be connected to the processor 910 and store instructions executable by the processor 910, data to be computed by the processor 910, or data processed by the processor 910. The memory 920 may include a non-transitory computer-readable medium, for example, high-speed random-access memory, and/or a non-volatile computer-readable medium, for example, one or more disk storage devices, flash memory devices, and/or other non-volatile solid-state memory devices.

The processor 910 may execute the instructions to perform the operations described above with reference to FIGS. 1 through 8 and 10. The processor 910 may perform any one, any combination, or all of the operations and methods described herein with reference to FIGS. 1 through 8 and 10. For example, the processor 910 may generate a first sample image and a second sample image by performing data augmentation on an input training image, generate a first feature map of the first sample image and a second feature map of the second sample image by performing feature extraction on the first sample image and the second sample image through an encoding model, determine first loss data according to a relationship between first feature vectors of the first feature map and second feature vectors of the second feature map, estimate relative geometric information of the first feature map and the second feature map through a relationship estimation model, determine second loss data according to the relative geometric information, based on label data according to a geometric arrangement of the first sample image and the second sample image in the input training image, and train the encoding model and the relationship estimation model, based on the first loss data and the second loss data. In addition, the description provided with reference to FIGS. 1 through 8 and 10 may apply to the training apparatus 900 of FIG. 9.

Figure 10:
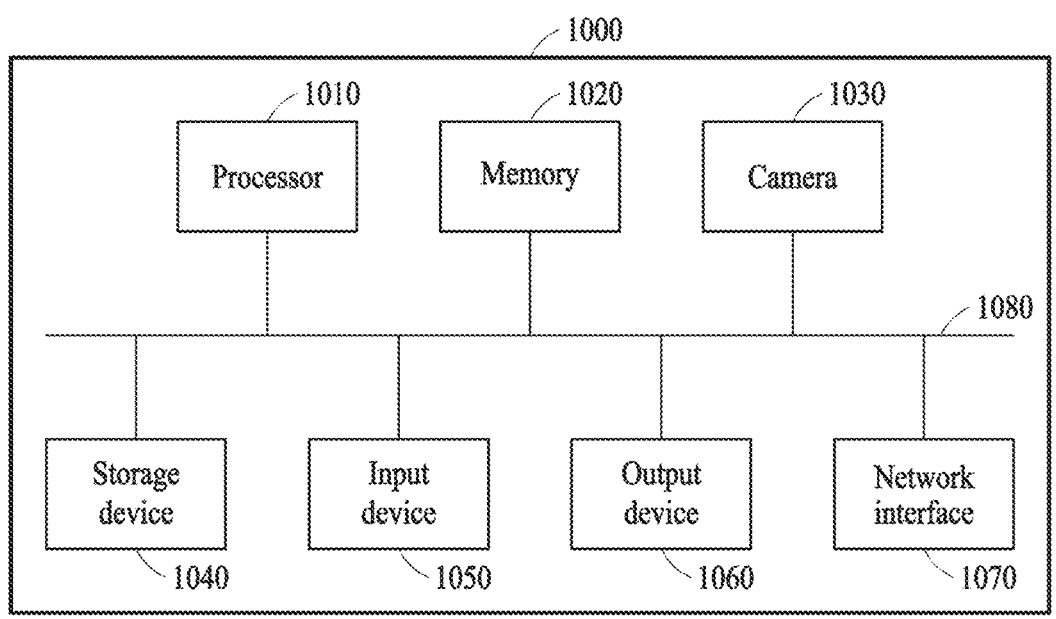
FIG. 10 illustrates an example of a schematic configuration of an electronic apparatus.

FIG. 10 illustrates an example of a schematic configuration of an electronic apparatus. Referring to FIG. 10, an electronic apparatus 1000 may include a processor 1010 (e.g., one or more processors), a memory 1020 (e.g., one or more memories), a camera 1030, a storage device 1040, an input device 1050, an output device 1060, and a network interface 1070 that may communicate with each other through a communication bus 1080. For example, the electronic device 1000 may be, or be implemented as at least a part of, a mobile device such as a mobile phone, a smartphone, a personal digital assistant (PDA), a netbook, a tablet computer or a laptop computer, a wearable device, such as a smart watch, a smart band or smart glasses, a computing device, such as a desktop or a server, a home appliance, such as a television, a smart television or a refrigerator, a security device, such as a door lock, or a vehicle, such as an autonomous vehicle or a smart vehicle. The electronic device 1000 may be or may include the training apparatus 900 of FIG. 9.

The processor 1010 may execute functions and instructions to be executed by the electronic apparatus 1000. For example, the processor 1010 may process the instructions stored in the memory 1020 or the storage device 1040. The processor 1010 may perform any one, any combination, or all of the operations described herein with reference to FIGS. 1 through 9. The memory 1020 may include a computer-readable storage medium or a computer-readable storage device. The memory 1020 may store instructions to be executed by the processor 1010, and store related information while software and/or applications are executed by the electronic device 1000.

The camera 1030 may capture a photo and/or record a video. The storage device 1040 may include a computer-readable storage medium or computer-readable storage device. The storage device 1040 may store a greater amount of information than the memory 1020 and may store the information for a long time. The storage device 1040 may include, for example, a magnetic hard disk, an optical disc, a flash memory, a floppy disk, and other types of non-volatile memory devices well known in the related technical fields.

The input device 1050 may receive an input from a user by a traditional input method through a keyboard and a mouse and by a new input method through a touch input, a voice input, and an image input. The input device 1050 may include, for example, a keyboard, a mouse, a touchscreen, a microphone, and any other device that may detect an input from a user and transmit the detected input to the electronic device 1000. The output device 1060 may provide an output of the electronic apparatus 1000 to a user through a visual, auditory, or tactile channel. The output device 1060 may include, for example, a display, a touchscreen, a speaker, a vibration generation device, and any other device that may provide an output to a user. The network interface 1070 may communicate with an external device through a wired or wireless network.

The training apparatuses, processors, memories, electronic apparatuses, cameras, storage devices, input devices, output devices, network interfaces, communication buses, training apparatus 900, processor 910, memory 920, electronic apparatus 1000, processor 1010, memory 1020, camera 1030, storage device 1040, input device 1050, output device 1060, network interface 1070, communication bus 1080, and other apparatuses, units, modules, devices, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method comprising:
generating a first sample image and a second sample image by performing data augmentation on an input training image;
generating a first feature map of the first sample image and a second feature map of the second sample image by performing feature extraction on the first sample image and the second sample image using an encoding model;
determining first loss data according to a relationship between first feature vectors of the first feature map and second feature vectors of the second feature map;
estimating relative geometric information of the first feature map and the second feature map using a relationship estimation model;
determining second loss data according to the relative geometric information, based on label data according to a geometric arrangement of the first sample image and the second sample image in the input training image; and
training the encoding model and the relationship estimation model, based on the first loss data and the second loss data.

2. The method of claim 1, wherein the determining of the first loss data comprises:
selecting, from among the first feature vectors and the second feature vectors, overlapping feature vectors corresponding to an overlapping region of the first sample image and the second sample image; and
determining the first loss data, based on a difference between the overlapping feature vectors.

3. The method of claim 1, wherein the relative geometric information comprises at least a portion of relative position information of corresponding grid cells according to the first feature vectors and the second feature vectors in the input training image and relative scale information of corresponding images according to the first feature map and the second feature map.

4. The method of claim 3, wherein the corresponding images comprise either one or both of:
the first sample image and the second sample image; and
a first resized image resized from the first sample image and a second resized image resized from the second sample image.

5. The method of claim 3, wherein
the relative position information is configured to specify an offset between the corresponding grid cells as an x-axis component and a y-axis component, and
the relative scale information is configured to specify a scale ratio of the corresponding images as a width component and a height component.

6. The method of claim 3, wherein the label data comprises at least a portion of label data of the relative position information according to grid cells of the first sample image and the second sample image and label data of the relative scale information according to the first sample image and the second sample image.

7. The method of claim 1, wherein the relative geometric information comprises mask information representing an overlapping region of corresponding images according to the first feature map and the second feature map.

8. The method of claim 7, wherein the label data comprises label data of the mask information according to the first sample image and the second sample image.

9. The method of claim 1, wherein
the label data is determined according to the geometric arrangement of the first sample image and the second sample image, and
the determining of the second loss data comprises determining the second loss data, based on a difference between the label data and the relative geometric information.

10. The method of claim 1, wherein the encoding model and the relationship estimation model correspond to a neural network model.

11. The method of claim 1, wherein the estimating of the relative geometric information comprises:
determining input data by concatenating the first feature map and the second feature map; and
estimating the relative geometric information by performing a convolution operation according to the input data.

12. A non-transitory computer-readable storage medium storing instructions that, when executed by one or more processors, configure the one or more processors to perform the method of claim 1.

13. An apparatus comprising:
one or more processors configured to:
generate a first sample image and a second sample image by performing data augmentation on an input training image;
generate a first feature map of the first sample image and a second feature map of the second sample image by performing feature extraction on the first sample image and the second sample image using an encoding model;
determine first loss data according to a relationship between first feature vectors of the first feature map and second feature vectors of the second feature map;
estimate relative geometric information of the first feature map and the second feature map using a relationship estimation model;
determine second loss data according to the relative geometric information, based on label data according to a geometric arrangement of the first sample image and the second sample image in the input training image; and
train the encoding model and the relationship estimation model, based on the first loss data and the second loss data.

14. The apparatus of claim 13, wherein, for the determining of the first loss data, the one or more processors are configured to:
select, from among the first feature vectors and the second feature vectors, overlapping feature vectors corresponding to an overlapping region of the first sample image and the second sample image; and
determine the first loss data, based on a difference between the overlapping feature vectors.

15. The apparatus of claim 13, wherein the relative geometric information comprises at least a portion of relative position information of corresponding grid cells according to the first feature vectors and the second feature vectors in the input training image and relative scale information of corresponding images according to the first feature map and the second feature map.

16. The apparatus of claim 15, wherein the label data comprises label data of the relative position information according to grid cells of the first sample image and the second sample image and label data of the relative scale information according to the first sample image and the second sample image.

17. The apparatus of claim 13, wherein the relative geometric information comprises mask information representing an overlapping region of corresponding images according to the first feature map and the second feature map.

18. The apparatus of claim 17, wherein the label data comprises label data of the mask information according to the first sample image and the second sample image.

19. The apparatus of claim 13, wherein
the label data is determined according to the geometric arrangement of the first sample image and the second sample image, and
for the determining of the second loss data, the one or more processors are configured to: determine the second loss data, based on a difference between the label data and the relative geometric information.

20. The apparatus of claim 13, wherein the encoding model and the relationship estimation model correspond to a neural network model.

21. The apparatus of claim 13, wherein, for the estimating of the relative geometric information, the one or more processors are configured to:
determine input data by concatenating the first feature map and the second feature map; and
estimate the relative geometric information by performing a convolution operation according to the input data.

22. The apparatus of claim 13, wherein the one or more processors are configured to generate a feature map of an image by performing feature extraction on the image using the trained encoding model.

23. The apparatus of claim 13, further comprising a memory storing instructions that, when executed by the one or more processors, configure the one or more processors to perform the generating of the first sample image and the second sample image, the generating of the first feature map and the second feature map, the determining of the first loss data, the estimating of the relative geometric information, the determining of the second loss data, and the training of the encoding model and the relationship estimation model.

24. An apparatus comprising:
one or more processors configured to generate a feature map of an image by performing feature extraction on the image using a trained encoding model,
wherein the encoding model is trained based on first loss data and second loss data,
wherein the first loss data is determined based on first feature vectors of a first feature map and second feature vectors of a second feature map, and the first feature map and the second feature map are generated by performing feature extraction respectively on a first sample image and a second sample image using the encoding model, and
wherein the second loss data is determined based on estimated relative geometric information of the first feature map and the second feature map, and the relative geometric information is estimated using a relationship estimation model.

* * * * *